3,024,813
RUBBER HOSE
Derek William Sear, Solihull, and Colin Wynne Evans, Little Hulton, Walkden, Manchester, England, assignors to Dunlop Rubber Company Limited, county of London, England, a British company
No Drawing. Filed Aug. 4, 1958, Ser. No. 753,138
Claims priority, application Great Britain Sept. 7, 1957
3 Claims. (Cl. 138—137)

This invention relates to rubber hose.

Rubber hose is used for the conveyance of fluids both gaseous and liquid but its use is usually limited to those materials which do not attack the rubber walls of the hose. Corrosive gases, for example hydrogen chloride and sulphur dioxide, and liquids, for example organic solvents, which cause the rubber to swell, as well as strong acids such as concentrated hydrochloric, sulphuric or nitric acid which attack it, can be conveyed only for short periods and then at the expense of serious attack and breakdown of the hose itself.

Polyethylene has properties which render it very suitable for the production of chemically resistant hose but it is unsatisfactory when used alone as the hose obtained lacks resilience, strength and flexibility while in attempting to use it in conjunction with rubber it has been found necessary to effect a mechanical lock between the polyethylene and the rubber layers on account of the difficulty of effecting adhesion.

It has now been found that polyethylene and other polyolefines can be bonded to natural and synthetic rubbers and the object of the invention is to provide hose having a chemically resistant lining of polyethylene or other polyolefine bonded to an outer layer of natural or synthetic rubber. Such hose has an improved resistance to solvents and corrosive chemicals while retaining the flexibility, strength and general characteristics associated with rubber hose. Such hose may also be advantageously used in the food and antibiotics industries.

It is a further object of the invention to provide a method of making rubber hose with an integral chemically resistant lining having improved resistance to solvents and corrosive chemicals.

According to the present invention rubber hose comprises a lining of a polymer of a mono-olefine or a copolymer of mixed mono-olefines bonded to an outer layer of vulcanised rubber.

Also according to the present invention a method of manufacturing rubber hose comprises bonding together a lining of a polymer of a mono-olefine or copolymer of mixed mono-olefines and an outer layer of rubber.

In a preferred form of the invention the lining consists of high density polyethylene the specific gravity of which is at least 0.94 and which is usually prepared by polymerisation of ethylene by means of a contact catalyst at low temperatures and pressures, for example 60° C.– 250° C. and up to 200 atmospheres. Such polyethylenes are substantially unaffected by strong acids and other chemicals.

The lining may also consist of low density polyethylene having a specific gravity of about 0.92 and usually prepared by polymerisation of ethylene under high pressures for example over 1000 atmospheres.

The lining of polyolefines is of such thickness that the hose remains flexible and has sufficient chemical resistance for the conveyance of corrosive materials, organic solvents and the like.

The polyolefine lining is bonded to the adjoining rubber layer. This bonding may be accomplished in a number of ways, one of which is by means of an organic peroxy compound which is preferably incorporated into the rubber and on heating partially migrates across the interface of the rubber and polyolefine causing chemical bonding of the two layers to occur. When this method is employed the polyolefine used must be one capable of being cross-linked by the peroxy compound used.

This process of bonding a surface of a polymerised mono-olefine to an elastomer vulcanisable by an organic peroxy compound forms in part the subject-matter of copending application Ser. No. 716,049, filed February 18, 1958 and British application No. 20,490/58.

Suitable organic peroxy compounds which may be used include di-tertiary butyl peroxide, dibenzoyl peroxide, dicumyl peroxide; hydro-peroxides, for example $\chi$-$\chi$-dimethyl-benzyl (cumyl) hydroperoxide and tertiary butyl hydro-peroxide; and peresters, for example tertiary butyl perbenzoate.

An alternative method of bonding the polyolefine lining to the rubber is by means of an intermediate layer of fully or partially hydrogenated polybutadiene. In some constructions a combination of these bonding methods may be used wherein the hydrogenated polybutadiene and/or the rubber is first mixed with an organic peroxy compound.

According to one method of constructing hose according to the invention a tube of a polyolefine or a copolymer of two or more olefines of requisite thickness is first slipped over a mandrel. It has been found by experience that the polyolefine tube should fit as tightly as possible consistent with its having sufficient clearance for running on easily. If the tube is too loose, air-marking of the surface in contact with a metal mandrel occurs when the hose is vulcanised. As an alternative the olefine polymer or copolymer can be wound on the mandrel as a thin strip. The lining may alternatively comprise a number of polyolefine layers.

If the bonding is to be by the use of an organic peroxy compound incorporated only in the rubber the polyolefine adjacent the rubber should be free from carbon black or other additives which impair its interaction with free radicals formed from the peroxy compound.

If however a low density polyethylene is used a slightly different bonding technique is employed due in part to the somewhat lower softening point of this type of polyethylene. The polymer, which may be in the form of granules or powder, is first softened by heating, for example in a steam jacketed internal mixer, and then mixed with an organic peroxy compound. Carbon black may also be added if desired to this mixture without impairing the subsequent bonding obtained. After thorough mixing, the composition while still hot and plastic is sheeted out on a roller mill and used as the inner lining in constructing hose according to the invention.

Before applying the rubber layer the surface of the polyolefine layer should be thoroughly cleaned, in order to remove not only surface contamination, but also the surface layer which may have become oxidised. Such cleaning may be suitably achieved by rubbing with fine steel wool but it is not necessary to produce a rough surface.

Over the polyolefine layer is applied a layer of a rubber composition.

One method of applying the rubber composition consists of passing the mandrel and polyolefine tube through a cross-head extruder. This ensures that there is no contamination of the rubber at the interface with the cleaned polyolefine.

If the bonding process is by means of an organic peroxy compound this is incorporated in the rubber composition, in the polyolefine, or in both layers and acts as a vulcanising agent and a bonding agent. This assembly can be vulcanised at this stage by lapping with cloth and heating in an autoclave at a temperature and for a time sufficient to effect vulcanisation of the rubber layer and to effect bonding of the polyolefine thereto. The construction of the hose may now be continued in known manner and textile or wire for reinforcement of the hose applied by braiding or other methods followed by the application of an outer rubber layer. The hose assembly after lapping with cloth is then vulcanised, for example by heating in an autoclave. The outer rubber layer should preferably be abrasion-resistant and also resistant to splashes of the chemicals for the conveyance of which the hose is intended.

As an alternative form of construction the hose may be built completely before vulcanising the rubber and bonding the polyolefine layer thereto and this method is conveniently employed when a hydrogenated polybutadiene is used as the bonding agent for the layers.

The hydrogenated polybutadiene may be completely chemically saturated but preferably retains sufficient unsaturation to be capable of being cross-linked by sulphur vulcanisation in which case it is first mixed with vulcanising agents, for example sulphur, zinc oxide and an organic accelerator of vulcanisation. A thin sheet of this composition is applied over the layer of polyolefine on the mandrel. A layer of a vulcanisable rubber composition is then applied and the whole assembly, vulcanised and bonded by first wrapping tightly with cloth and then heating, for example in open steam at a temperature of approximately 153° C. for 30 minutes.

Instead of being applied as a thin sheet the hydrogenated polybutadiene composition can also be applied as a solution in a volatile solvent, for example trichlorethylene or toluene.

Polyolefines which have been found particularly suitable for lining hoses are the polyethylenes commercially available as "Marlex" (registered trademark) type 50, Hostalen (registered trademark) type P.D. and Alkathene (registered trademark) type H.D.

The rubber composition used may instead of natural rubber be a copolymer of butadiene with styrene.

Over the rubber layer which is bonded to the polyolefine other synthetic rubbers may be used, including copolymers of butadiene with acrylonitrile, acrylic esters, or alkyl-acrylic esters, unsaturated ketones or other compounds containing a vinyl group, which are copolymerisable with butadiene. Polymerised chloroprene, polysulphide thioplasts and polysiloxane elastomers are also suitable for the outer layers of the hose in some applications. Mixtures of such synthetic rubbers with each other or with natural rubber can also be used.

The invention is illustrated by the following examples:

*Example I*

A tube of Marlex (registered trademark) type 50 of 19 millimetres diameter and having a wall thickness of 1 millimetre was applied to a steel mandrel and covered with a layer 1.5 millimetres thick of the following rubber composition:

| | Parts by weight |
|---|---|
| Natural rubber | 100 |
| High abrasion furnace black | 60 |
| Dicumyl peroxide | 4 |

Above this layer was wrapped two layers of sulphur vulcanising rubbered textile fabric wound on helically. Above this a layer approximately 3 millimetres thick of a sulphur-vulcanising natural rubber composition was applied. The assembly was first tightly lapped with cloth and then vulcanised by heating for 30 minutes in steam at a temperature of 153° C. Examination of the hose so formed showed that the polyethylene lining was bonded to the rubber hose and could not be separated except by destruction of the adjoining composition.

*Example II*

A hose was constructed as described in the previous example but using the following rubber composition in place of that previously given in contact with the polyethylene layer.

| | Parts by weight |
|---|---|
| Natural rubber | 86.0 |
| Butadiene/styrene copolymer rubber | 14.0 |
| Lamp black | 71.5 |
| China clay | 46.0 |
| Stearic acid | 1.2 |
| Dicumyl peroxide | 4.0 |

After assembly the hose was vulcanised for 30 minutes at 153° C. Again the polyethylene was firmly bonded in the hose to the adjacent rubber layer.

*Example III*

A hose was made using a layer of high density polyethylene made by polymerisation at low temperature and pressure in presence of an aluminium trialkyl complex (known as a Ziegler catalyst) and a layer of either of the rubber compositions given in the previous examples. The assembled hose was vulcanised by heating for 60 minutes at a temperature of 145° C.

On examination the polyethylene layer was found to be firmly bonded to the overlying rubber layer.

*Example IV*

The following mixing was prepared on a roller mill:

| | Parts by weight |
|---|---|
| Hydrogenated polybutadiene (containing some residual unsaturation) | 100 |
| Sulphur | 3.0 |
| Zinc oxide | 50.0 |
| Mineral oil | 5.0 |
| Stearic acid | 0.5 |
| Mercaptobenzthiazole | 0.5 |
| Sym-di-beta-naphthyl-para-phenylene diamine | 1.0 |

The mixture was formed into a sheet one millimetre thick and then cut into strips approximately 2.5 centimetres wide.

A thin extruded tube of high density polyethylene of internal diameter 19 mm. was slipped on to a 19 mm. diameter steel mandrel to form a tight fit. A strip of the above composition was helically wound on to the polyethylene tube completely to cover it and then a layer of a natural rubber mixing containing sulphur, accelerator and zinc oxide was applied followed by two layers of rubberised fabric and finally a layer of a natural rubber composition to form the hose cover. This construction was tightly wrapped with finely woven cotton cloth and vulcanised and bonded together by heating for 30 minutes in open steam at a temperature of 153° C.

On removing the mandrel and the cloth wrapping it was found that a satisfactory rubber hose had been formed having a polyethylene lining firmly adhered to the rubber.

*Examples V–VIII*

To illustrate the use of various other peroxy compounds suitable for bonding a polyethylene lining to rubber hose the following mixings were first prepared on a roller mill in known manner, all parts being by weight.

| | Examples | | | |
|---|---|---|---|---|
| | V | VI | VII | VIII |
| Smoked sheet rubber | 100 | 100 | 100 | 100 |
| China clay | 50 | 50 | 50 | 50 |
| Tertiary butyl perbenzoate | 4 | | | |
| Tertiary butyl hydroperoxide | | 4 | | |
| Di-tertiary butyl peroxide | | | 4 | |
| Dibenzoyl peroxide | | | | 10 |

The mixings after preparation were sheeted out to a thickness of approximately 6 mm. and applied to the surface of tubes of polyethylene of density 0.95 gram/cc. and approximately 1 mm. thick. After heating for 60 minutes at 148° C. the polyethylene in each case was found to be bonded to the cross-linked rubber layer.

*Example IX*

When low density polyethylene is used as the lining, in order to achieve good results a slight modification of the technique used in the previous examples is required and is as follows:

Polyethylene of density 0.92 gm./cc. in the form of granules was softened in an internal mixer heated by steam to a temperature of 127° C. The polyethylene fused and massed together when the batch temperature had reached about 95° C. At this stage 2.5 parts by weight of dicumyl peroxide for each 100 parts of polyethylene was added and the mixing operation continued for 2 minutes. The batch was then removed. It had a temperature of about 105° C. and was sheeted out on a warm roller mill.

A portion of the sheeted material was wrapped round a tubular mandrel and covered with a layer of rubber compound of the following composition.

| | Parts by weight |
|---|---|
| Smoked sheet rubber | 86 |
| Butadiene/styrene copolymer (styrene approx. 25%) | 14 |
| Lamp black | 71.5 |
| China clay | 46.0 |
| Stearic acid | 1.2 |
| Dicumyl peroxide | 4.0 |

The tube so constructed was heated under pressure at a temperature of 163° C. for 30 minutes. After cooling it was found that the rubber composition and the polyethylene layer had become firmly bonded together.

*Example X*

The low density polyethylene used in the previous example was mixed in the internal mixer with 125 parts of medium Thermal Black for each 100 parts of polyethylene in addition to the dicumyl peroxide. The resulting batch was removed from the mixer while at a temperature of about 105° C. and sheeted out on a warm mill. To this sheet on a suitable mandrel was applied the rubber composition described in the previous example and after heating the assembly under the same conditions, the rubber compound and the polyethylene/black composition were found to be firmly bonded together.

*Example XI*

Two mixings of the following composition were made on a roller mill:

| | Parts by weight | |
|---|---|---|
| | (A) | (B) |
| Rubbery Copolymer of ethylene and propylene approximately of composition ethylene 38% propylene 62% | 100 | 100 |
| High abrasion furnace carbon black | 50 | |
| Medium processing channel carbon black | | 95 |
| Dicumyl peroxide | 4 | 4 |

After mixing, composition (A) was sheeted out to a thickness of 2 millimetres and composition (B) to a thickness of 1 millimetre.

A hose was then constructed by the following procedure:

On to a hose mandrel made of steel and 1 inch in diameter was wrapped a layer of composition (A) followed by a layer of composition (B). The surface was wiped with coal-tar naphtha and two layers of sulphur vulcanising rubbered textile fabric were wound on and then a layer approximately 3 millimetres thick of a sulphur vulcanising natural rubber compound of the following composition was applied.

| | Parts by weight |
|---|---|
| Natural rubber | 100 |
| Sulphur | 3.5 |
| Zinc oxide | 12.0 |
| Lamp black | 40.0 |
| Stearic acid | 2.0 |
| Mineral oil | 1.0 |
| Mercaptobenzthiazole | 0.9 |
| Phenyl-beta-naphthylamine | 1.5 |

The assembled hose was tightly lapped with cloth and vulcanised, consolidated and bonded by heating for 30 minutes in steam at a temperature of approximately 150° C. Examination of the hose after cooling and removal of the mandrel showed that the olefine copolymer lining was satisfactorily bonded to the rubber hose.

Hose prepared according to the foregoing examples is light in weight, flexible and strong, and possesses good resistance when used for the conveyance of corrosive chemicals or of solvents which seriously attack unprotected vulcanised rubber.

Having now described our invention—what we claim is:

1. Flexible rubber hose comprising a lining of a polymer selected from the group consisting of polymers of mono-olefines and copolymers of mixed mono-olefines and having an outer face, an outer layer of vulcanized rubber with a resiliency greater than the olefine polymer and having an inner face, and an interlayer of hydrogenated polybutadiene which contacts the outer face of the lining and the inner face of the outer layer of vulcanized rubber, the contacting faces being bonded together.

2. A method of making flexible rubber hose which comprises assembling a lining layer of a polymer selected from the group consisting of polymers of mono-olefines and copolymers of mono-olefines, an interlayer of hydrogenated polybutadiene in contact with the lining, and an outer layer of rubber in contact with the interlayer, and heating the assembly to achieve bonding of the layers.

3. A method of making flexible rubber hose which comprises assembling a lining of polyethylene and an outer layers of rubber including a layer of hydrogenated polybutadiene and bonding the rubber to the polyethylene by application of a layer of hydrogenated polybutadiene between the lining of polyethylene and the outer layer of rubber and heating the assembly to achieve bonding of the layers.

References Cited in the file of this patent

UNITED STATES PATENTS

| 2,628,214 | Pinkney | Feb. 10, 1953 |
| 2,668,789 | Phreaner | Feb. 9, 1954 |
| 2,690,769 | Brown | Oct. 5, 1954 |
| 2,711,986 | Strain et al. | June 28, 1955 |